Jan. 26, 1965 W. H. STOKES 3,167,280
STUDDED TRACTION STRAND ADAPTED TO BE EMBEDDED IN A TIRE TREAD
Filed June 11, 1963
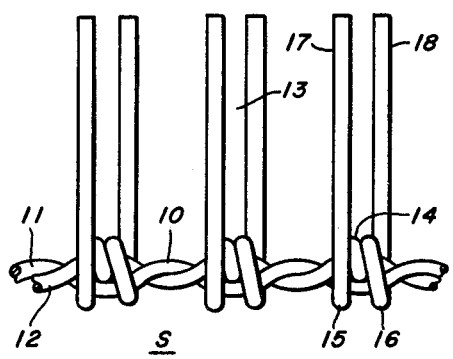
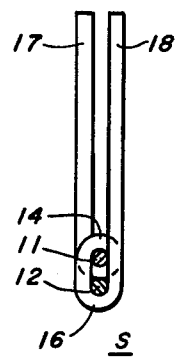
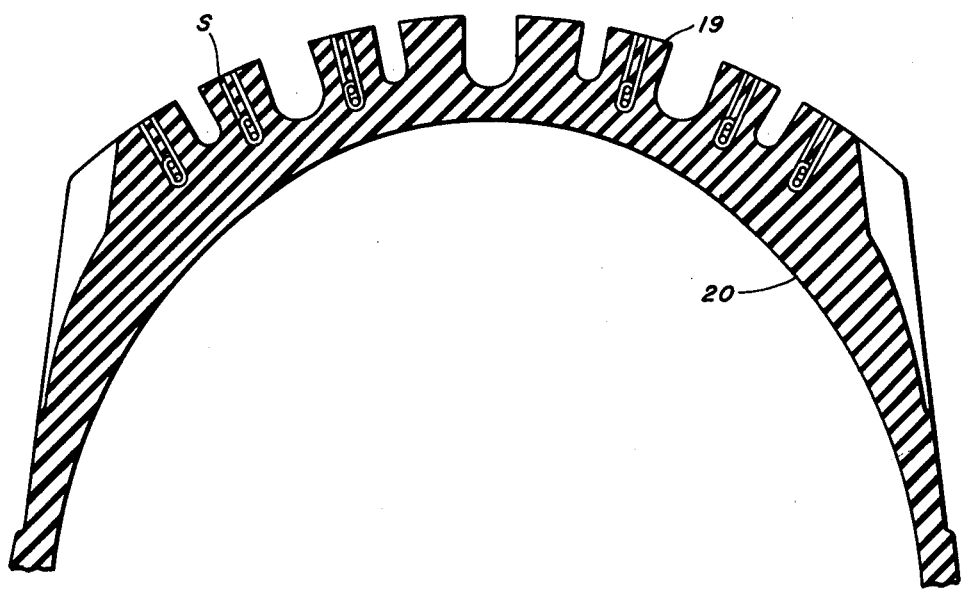
INVENTOR.
WILLIAM H. STOKES
By Donald G. Dalton
Attorney

United States Patent Office 3,167,280
Patented Jan. 26, 1965

---

3,167,280
STUDDED TRACTION STRAND ADAPTED TO BE EMBEDDED IN A TIRE TREAD
William H. Stokes, Lakewood, Ohio, assignor to United States Steel Corporation, a corporation of New Jersey
Filed June 11, 1963, Ser. No. 287,068
2 Claims. (Cl. 245—1)

This invention relates to a wire structure adapted to be embedded in a tire tread to increase the traction thereof on slippery surfaces, e.g., pavement covered with ice or snow.

Wire structures have been proposed heretofore for embedding in tire treads but have not been wholly satisfactory either because of short life resulting from fatigue failure or the impracticability of manufacture by machine at low cost. Examples are shown in Cousins Patent Re. 25,374. It is the object of my invention to improve on the structures shown therein. Further objects are to provide a structure composed of a base strand with studs spaced therealong and anchored thereto (a) so that displacement of studs along the strand cannot occur and (b) to provide attachment of the studs to the strand which will prevent angular movement of the former about the latter.

In a preferred embodiment, my improved structure comprises a strand of at least two wires twisted together with studs spaced therealong and extending outwardly therefrom in a common plane. Each stud is a separate length of wire the midportion of which is looped first around one wire of the base strand. One or both the adjacent portions are then looped around both strand wires, leaving the end portions of the length extending outwardly from the strand in parallel, side-by-side relation. The strand twist is preferably of a short pitch and the studs are preferably spaced so as to leave at least one full twist between adjacent studs.

A complete understanding of the invention may be obtained from the following detailed description and explanation which refer to the accompanying drawings illustrating the present preferred embodiment. In the drawings:

FIGURE 1 is a side elevation of my improved wire structure;

FIGURE 2 is a cross section showing a stud in end elevation; and

FIGURE 3 is a partial section of a tire tread showing my wire structure embedded therein.

Referring now in detail to the drawings and, for the present, to FIGURES 1 and 2, my wire structure S as shown therein comprises a base strand 10 composed of at least two wires 11 and 12 twisted together, with studs 13 spaced therealong and extending therefrom in a common plane. Each stud is formed by a separate length of wire, the midportion of which is bent in a loop 14 around one strand wire, e.g., 12. At least one of or both the portions of the wire length forming the stud, adjacent the midportion, are bent to form loops 15 and 16 around both wires 11 and 12 making up strand 10. As shown, furthermore, there is a full twist of strand 10, between adjacent studs. The ends 17 and 18 of the wire length forming the stud 13 extend outwardly from the strand substantially straight and substantially in parallel, side-by-side relation. All studs are in a common plane.

FIGURE 3 shows how structure S is embedded in the tread 19 of a tire 20. The structure may be straight and bent to the curvature of the tire or may be bent in the plane normal to that containing studs 13, to conform to the zig-zag, sinuous or other pattern of the tread lands.

It will be evident that the structure described affords a positive anchorage for the studs and prevents movement thereof relative to the strand, either longitudinally or angularly. The studs, as a matter of fact, cannot escape from the base strand yet the relation between them is such that stress in the studs is held to a minimum as a result of slight bending on rotation of a tire under load.

The wire structure of my invention has other important advantages. In the first place, it can be machine made at low cost. The parallel relation of the ends of the stud-forming wire lengths affords increased resistance to fatigue stress and firmer anchorage in the tread rubber. The fixed relation between studs and base facilitates placing the structure in the recesses of the tire molds. The base strand itself is very strong and highly resistant to such bending as it may be subjected to.

Although I have disclosed herein the preferred embodiment of my invention, I intend to cover as well any change or modification therein which may be made without departing from the spirit and scope of the invention.

I claim:

1. A traction-increasing wire structure adapted to be embedded in a tire tread comprising a base strand of at least two wires twisted together and studs spaced therealong extending outwardly from the strand, each stud being formed of a separate length of wire the midportion of the length being bent around one wire of said strand, at least one of the portions adjacent said midportion being bent around both strand wires, the end portions of said length being substantially straight, substantially parallel and in side-by-side relation.

2. A structure as defined in claim 1, characterized by said strand having at least one full twist between adjacent studs.

References Cited by the Examiner

UNITED STATES PATENTS

| 212,874 | 3/79 | Vaughan | 256—6 |
| 494,325 | 3/93 | Curtis | 256—6 |
| 1,740,616 | 12/29 | Midgley | 152—211 |
| 2,254,238 | 9/41 | Nelson | 140—58 |
| 3,003,534 | 10/51 | Cousins | 152—211 |

FOREIGN PATENTS

| 9,644 | 1904 | Great Britain. |

ARTHUR L. LA POINT, *Primary Examiner.*